(12) United States Patent
Londiche et al.

(10) Patent No.: US 9,513,027 B2
(45) Date of Patent: Dec. 6, 2016

(54) AIR VENT

(71) Applicant: Faurecia Innenraum Systeme GmbH, Hagenbach (DE)

(72) Inventors: Stephane Londiche, Montmagny (FR); Volker Doll, Ranschbach (DE); Julien Seiller, Munich (DE); Martin Schulz, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/278,865

(22) Filed: May 15, 2014

(65) Prior Publication Data

US 2014/0357179 A1  Dec. 4, 2014

(30) Foreign Application Priority Data

May 29, 2013  (DE) ........................ 10 2013 210 055

(51) Int. Cl.
*F24F 13/10* (2006.01)
*B64D 13/00* (2006.01)
(Continued)

(52) U.S. Cl.
CPC ............ *F24F 13/10* (2013.01); *B60H 1/3414* (2013.01); *B64D 13/00* (2013.01); *F24F 13/072* (2013.01);
(Continued)

(58) Field of Classification Search
CPC ... B60H 1/00564; B60H 1/00871; B60H 1/34; B60H 1/3414; B60H 1/345; B60H 2001/00092; B60H 2001/00214; B60H 2001/3478; B60H 2001/3492; B64D 2013/0625; F24F 7/04; F24F 13/072; F24F 13/075; F24F 13/10
(Continued)

(56) References Cited

U.S. PATENT DOCUMENTS 3,101,038 A * 8/1963 Archer .......................... 454/295
3,908,528 A * 9/1975 Bertin et al. .................. 454/314
(Continued)

FOREIGN PATENT DOCUMENTS

DE     102006032587 A1    1/2008
DE     102007019602 B3    6/2008
(Continued)

*Primary Examiner* — Gregory Huson
*Assistant Examiner* — Dana Tighe
(74) *Attorney, Agent, or Firm* — Reising Ethington P.C.

(57) ABSTRACT

An air vent is provided having a housing, an air inlet opening located in the axial direction with respect to the housing and an air discharge opening opposite the air inlet opening, an air-conveying element located in the housing having a first air-conveying surface and a second air-conveying surface, which is opposite the first air-conveying surface, wherein a first air channel is formed by the housing and the first air-conveying surface and a second air channel is formed by the housing and the second air-conveying surface, wherein the first air channel is configured to transport to the air discharge opening a first volume flow of air that can flow into the housing through the air inlet opening, wherein the second air channel is configured to transport to the air discharge opening a second volume flow of air that can flow into the housing through the air inlet opening, and a first wing, wherein the first wing is arranged movably on the end of the air-conveying element facing the air inlet opening, wherein the movability of the first wing is configured such that the ratio of first volume flow to second volume flow can be adjusted on account of the position of the first wing, wherein the second air-conveying surface may be symmetrical with respect to the first air-conveying surface.

21 Claims, 4 Drawing Sheets

(51) Int. Cl.
*F24F 13/072* (2006.01)
*B60H 1/34* (2006.01)
*B64D 13/06* (2006.01)

(52) U.S. Cl.
CPC ............... *B60H 2001/3478* (2013.01); *B64D 2013/0625* (2013.01)

(58) Field of Classification Search
USPC ........ 454/143, 152, 153, 154, 155, 284, 322
See application file for complete search history.

(56) References Cited

U.S. PATENT DOCUMENTS

| | | |
|---|---|---|
| 4,345,510 A | 8/1982 | Sterett |
| 5,356,336 A | 10/1994 | Stouffer et al. |
| 7,604,533 B2 | 10/2009 | Ogura et al. |
| 9,163,848 B2 | 10/2015 | Doll et al. |
| 2004/0152412 A1 | 8/2004 | Gehring et al. |
| 2008/0014855 A1 | 1/2008 | Leserre |
| 2008/0081550 A1* | 4/2008 | Shibata et al. ............... 454/155 |
| 2008/0146139 A1* | 6/2008 | Terai et al. ................... 454/155 |
| 2010/0011799 A1* | 1/2010 | Sakakibara .................... 62/426 |
| 2010/0130115 A1 | 5/2010 | Miki |
| 2010/0263401 A1* | 10/2010 | Sakakibara et al. ............ 62/408 |

FOREIGN PATENT DOCUMENTS

| | | |
|---|---|---|
| DE | 102011003435 A1 | 8/2012 |
| EP | 1331116 A2 | 7/2003 |
| FR | 2872260 A1 | 12/2005 |

\* cited by examiner

AIR VENT

BACKGROUND

The invention relates to an air vent.

Various air vents are known from the prior art. By way of example, DE 10 2006 032587 A1 discloses an air vent device for vehicles that comprises an air channel, which, as viewed in a longitudinal or vertical section, has a first upper wall region and an opposite second, lower wall region and which is in fluid connection via an air outlet opening to a passenger compartment of the vehicle. Air can be conveyed into the passenger compartment via the air channel and the air outlet opening. At least one lamella-like air-conveying element is arranged between the two wall regions in the region or in the vicinity of the air outlet opening.

Furthermore, DE 10 2007 019 602 B3 discloses an air vent having a conical air-conveying element, of which the pointed side points towards the air discharge opening. Furthermore, the air vent comprises laminar elements, which are arranged between the surface of the air-conveying element and the surface of the nozzle housing. The nozzle housing and the air-conveying element are configured to produce the Coandă effect, such that a directed air jet exits from the air discharge opening.

Lastly, FR 2 872 260 A1 presents a fan having an air channel, of which the mouth defines a discharge opening. A convex air-guiding element is arranged movably in the air channel, whereby the cross section of the air discharge and the direction of the exiting air can be changed.

SUMMARY OF THE INVENTION

The object of the invention is to create an air vent that is improved by comparison.

The object forming the basis of the invention is achieved by the features of one or more embodiments disclosed and/or described herein.

An air vent is specified having
a housing,
an air inlet opening located in the axial direction with respect to the housing and an air discharge opening opposite the air inlet opening,
an air-conveying element located in the housing, having a first air-conveying surface and a second air-conveying surface, which is opposite the first air-conveying surface and is symmetrical with respect to the first air-conveying surface, wherein a first air channel is formed by the housing and the first air-conveying surface and a second air channel is formed by the housing and the second air-conveying surface, wherein the first air channel is configured to transport to the air discharge opening a first volume flow of air that can flow into the housing through the air inlet opening, wherein the second air channel is configured to transport to the air discharge opening a second volume flow of air that can flow into the housing through the air inlet opening,
a first wing, wherein the first wing is arranged movably on the end of the air-conveying element facing the air inlet opening, wherein the movability of the first wing is configured such that the ratio of first volume flow to second volume flow can be adjusted on account of the position of the first wing.

The air vent can be used in a wide range of different transport means, such as road vehicles, aircraft, watercraft or rail vehicles. Embodiments of the invention could have the advantage that the outflow direction an airflow flowing out through the air vent can be controlled without the wings used for this purpose being visible to a user of the air vent. The surface for any dust deposits visible when looking at the air vent is thus minimised, which could simplify the external cleaning of the air vent.

Depending on the ratio of first volume flow to second volume flow, the discharge direction of the air perceivable outside the air vent can be changed, since the first and second air channel can ensure a defined airflow direction. It is noted that, in the case in which the first and the second volume flow are identical, the air outflow direction is parallel to the axis of the housing of the air vent.

In accordance with an embodiment of the invention the air-conveying element is rigid with respect to the housing. This could have the advantage that the airflow direction can be changed by merely a single movable element in the region, through which air can flow, between the air inlet opening and the air discharge opening. This could simplify the mechanical structure of the air vent and make it more stable.

In accordance with an embodiment of the invention the first air-conveying surface transitions into the second air-conveying surface in a transition region at the end of the air-conveying element facing the air inlet opening, wherein the first wing bears against the air-conveying element in the transition region. For example, the first wing has a symmetrical form tapering in the direction of the air inlet opening, wherein the side of the wing opposite the air discharge opening is formed in a manner complementary to the transition region.

This could have the advantage that the air resistance in the region between the first wing and the air-conveying element can be minimised. Due to the fact that the first wing nestles against the "rear face" of the air-conveying element, the surface geometries of the first air-conveying surface and the surface adjacent thereto of the first wing can be adapted to one another such that, in this region, an air resistance existing due to the transition between the air-conveying element and first wing is minimised. Said transition, for example, can be streamlined if the ratio of first volume flow to second volume flow is one.

In accordance with an embodiment of the invention the first wing is a single first wing, wherein the ratio of first volume flow to second volume flow can be adjusted by means of the single first wing. This reduces the mechanical components located in the airflow so as to deflect the airflow, whereby the air resistance and the noise generation when the airflow passes over these mechanical components are minimised.

In accordance with an embodiment of the invention, the first air-conveying surface has a first bulge and the second air-conveying surface has a second bulge, wherein the first bulge points in a first direction and the second bulge points in a second direction, wherein the first direction and the second direction are directed oppositely and point perpendicularly to the axial direction, wherein the inner side of the housing
  in the region of the first bulge has a third bulge pointing in the first direction and/or
  in the region of the second bulge has a fourth bulge pointing in the second direction.

This could further increase the directional characteristic of the air flowing out from the air discharge opening, since the third and/or fourth bulge now also could contribute to the creation of a laminar property of the airflow. For example, the third bulge runs parallel to the first bulge and/or the fourth bulge runs parallel to the second bulge.

In accordance with an embodiment of the invention the air-conveying element has a cross section shaped in the manner of a truncated egg. This could have the advantage that the laminar property of the airflow existing from the air discharge opening can be maximised and the air resistance in the housing can be minimised.

In accordance with an embodiment of the invention the first wing is movable between a first and a second position, wherein in the first position the first air channel is completely closed by the first wing, and wherein in the second position the second air channel is completely closed by the first wing.

This could help enable the ratio between the first and second volume flow to be adjusted even more precisely.

For example, the first wing is movable between a first and a second position, wherein the first wing has a plane of symmetry, wherein the housing and the first wing are configured such that, as viewed in the plane of symmetry, the first wing in the first position bears fully against an inner wall of the housing, and, as viewed in the plane of symmetry, the first wing in the second position bears fully against the inner wall of the housing. Further, the inner wall of the housing has a rectangular shape at the height of the position of the first wing, for example as viewed in the axial direction with respect to the housing.

The rectangular shape could simplify the construction and therefore the production costs of the air vent, since a rectangular shape could be selected both for the inner wall of the housing and for the corresponding shape of the first wing bearing against the housing wall. In the first position, the first wing bearing fully against the inner wall of the housing can thus close the first air channel, for example, and can therefore reliably define the volume flow through the second air channel.

In accordance with an embodiment of the invention the air vent further has a lighting means, wherein the lighting means is arranged between the air discharge opening and the first wing. This could ensure a simplified operability of the air vent in darkness. Since it is not necessary to arrange any wings between the lighting means and air outlet opening, said wings influencing the directional characteristics of the airflow, the light can illuminate the air vent from the inside in an unimpeded manner.

In accordance with an embodiment of the invention, the air vent further has a set of second wings, wherein the first wing is pivotable in a direction lying in a first plane, wherein the second wings are pivotable in a direction lying in a second plane, wherein the first plane and the second plane are arranged at right angles to one another, wherein, due to the pivotability of the second wings, the flow direction of the air that can flow into the housing through the air inlet opening can be adjusted in the second plane, perpendicularly to the axial housing direction. This could have the advantage that the adjustability of the direction of action of the airflow is supplemented by a further direction, specifically perpendicularly to the direction that is predefinable by the first and second wings.

In accordance with an embodiment of the invention the second wings are arranged between the first wing and the air inlet opening as viewed in the axial direction of the housing.

In accordance with an embodiment of the invention the air vent further comprises a closure element, wherein the closure element is arranged between the air inlet opening and the first wing, wherein the closure element is movable between an open position and a closed position, wherein in the open position an air passage between the air inlet opening and the air discharge opening is released, and in the closed position the air passage between the air inlet opening and the air discharge opening is blocked. An airflow through the housing can thus be blocked practically completely.

For example, the closure element comprises a plurality of plates, wherein the plates are hinged to the housing via a common pivot pin, wherein the movability of the closure element between the open position and the closed position is provided via a rotation of the plates about the pivot pin. For example, the pivot pin is arranged on the housing in a manner centred with respect to the housing. In the region of the plates both the inner side of the housing and the plates are preferably formed at right angles in a complementary manner and in a manner bearing against one another. This variant of the use of a plurality of plates, in particular two plates, could enable the advantage of a space-saving housing of the closure element in the housing.

In accordance with an embodiment of the invention the air vent further comprises a manipulator at the air discharge opening of the housing, wherein the manipulator is mechanically coupled via a first coupling to the first wing, wherein the first coupling is configured to convert a movement of the manipulator in the first or second direction into a movement of the first wing in this first or second direction. For example, the first coupling comprises a first coupling rod coupled to the manipulator and a second coupling rod coupled to the first wing, wherein the first coupling rod is mounted pivotably about a first pivot point, wherein the second coupling rod is mounted pivotably about a second pivot point, wherein the first coupling rod and the second coupling rod are mechanically coupled to one another via a first sliding block guide. The first sliding block guide thus enables a transmission of force between the first and the second coupling rod when the first coupling rod is moved via the manipulator into the first or second direction, A movement, however, of the manipulator and therefore of the first coupling rod perpendicularly hereto is not transmitted as force to the second coupling rod—here, the first coupling rod for example "shifts" laterally as a sliding block through the link formed by the second coupling rod.

Within the scope of the description a sliding block guide is understood here to mean a combination of an elongate groove and a shaft guided in this groove, wherein the shaft is guided through the groove perpendicularly to the direction of the extension of the shaft and perpendicularly to the direction of extension of the groove. However, the shaft is preferably freely movable in the groove in the axial direction.

In accordance with an embodiment of the invention, the manipulator is mechanically coupled via a second coupling to the second wings, wherein the second coupling is configured to convert a movement of the manipulator in a direction lying in the second plane perpendicularly to the first direction and perpendicularly to the axial direction of the housing into the pivot movement of the second wings.

In accordance with an embodiment of the invention the second coupling comprises a third coupling rod, wherein the third coupling rod is coupled to at least one of the second wings, wherein the first coupling rod and the third coupling rod are mechanically coupled to one another via a second sliding block guide for a transmission of force between the first coupling rod and the third coupling rod, wherein the first sliding block guide is configured to allow a relative movability of the first coupling rod and of the second coupling rod in the direction lying in the second plane perpendicularly to the first direction and perpendicularly to the axial direction of the housing ("shift through"). A relative movement of the first and third coupling rod in the vertical direction, that is to say in the first and second direction, by contrast, is not reproduced by the second link or is not reproduced as well as a transmission of force between the first and third coupling rod.

Due to a single manipulator and the movability thereof in two dimensions, the airflow exiting from the air discharge opening can therefore be steered in two dimensions.

In accordance with an embodiment of the invention the first coupling is arranged completely in the air-conveying element. This can further reduce the air resistance in the housing.

Of course, the above-described embodiments can be combined with one another arbitrarily, provided the combinations are not mutually exclusive.

BRIEF DESCRIPTION OF THE DRAWINGS

Preferred embodiments of the invention will be explained in greater detail hereinafter with reference to the drawings.

In the drawings.

DETAILED DESCRIPTION OF THE INVENTION

Similar elements will be denoted hereinafter by like reference signs.

Figure 1:
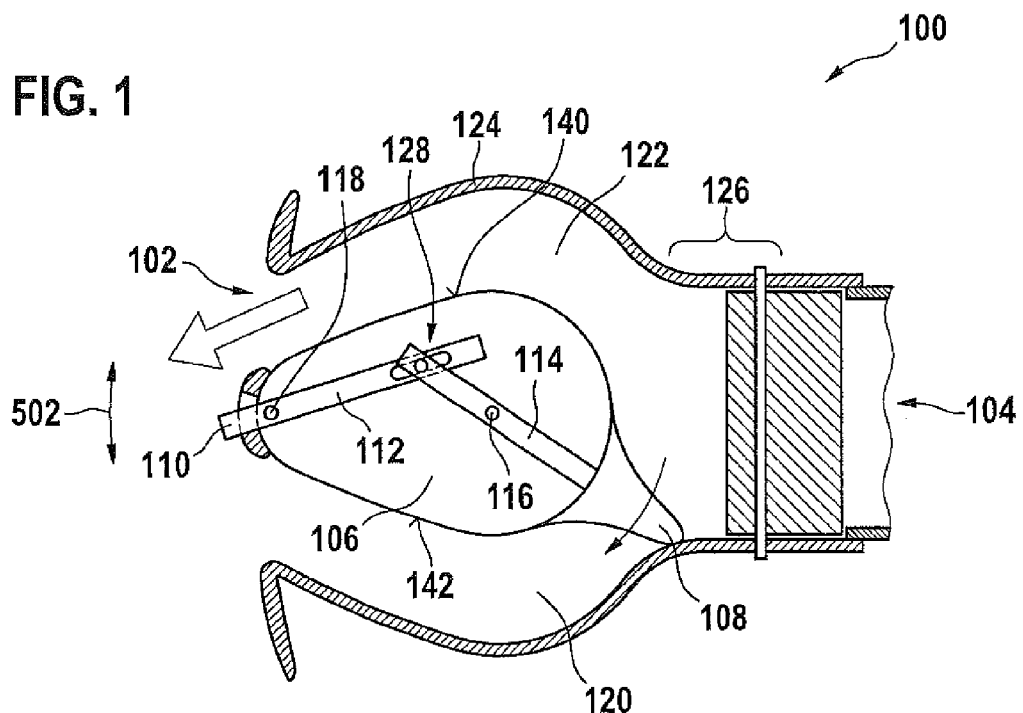
FIG. 1 shows a schematic view of the air vent.

FIG. 1 shows a cross-sectional view of an air vent 100 having a hosing 124, an air inlet opening 104 located in the axial direction with respect to the housing 124, and an air discharge opening 102 axially opposite the air inlet opening. An egg-shaped air-conveying element 106 with air-conveying surfaces 140 and 142 opposite one another as viewed in the vertical direction are located in the housing 124. The air-conveying surfaces 140 and 142 are distanced here from the inner walls of the housing 124. An air channel 122 is thus created between the air-conveying surface 140 and the inner wall of the housing, and an air channel 120 is thus created between the air-conveying surface 142 and the inner wall of the housing 124. An airflow can be transported from the air inlet opening 104 to the air discharge opening 102 through the air channels 120 and 122.

Further, a wing 108 is arranged movably on the side of the air-conveying element 106 facing the air inlet opening 104. This wing 108 is pivotable here between different positions about the rear face of the air-conveying element 106, as can be seen in the comparison between FIGS. 1 and 2. In FIG. 1 the air-conveying element is pivoted fully downwardly, and in FIG. 2 the air-conveying element is pivoted fully upwardly. As a result of this, in FIG. 1 air flows exclusively through the air channel 122, whereas the air channel 120 is blocked by the air-conveying element 108. By contrast, in FIG. 2 air flows exclusively through the air channel 120, whereas the air channel 122 is blocked by the wing 108. As is indicated by the corresponding arrows in FIGS. 1 and 2, this means that in FIG. 1 an airflow directed downwardly exits from the air discharge opening 102. By contrast, the airflow is directed upwardly in FIG. 2. Due to the egg shape of the air-conveying element 106 and the inner walls of the housing 124 running parallel thereto, the purposeful directing of the airflow is intensified.

Figure 2:
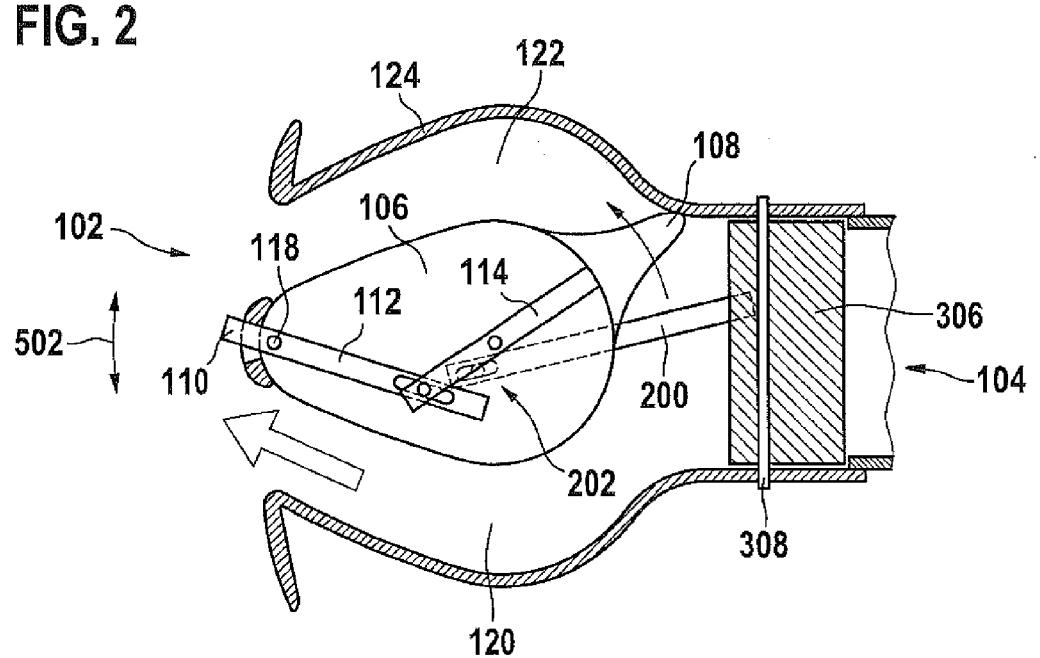
FIG. 2 shows a further schematic view of the air vent of FIG. 1.

If the wing 108 is located in a position between the two positions shown in FIGS. 1 and 2, that is to say if the wing 108 is located in a horizontal position parallel to the axis of the housing 124, an airflow is thus conveyed simultaneously through the air channels 120 and 122. As a result, an airflow that is directed substantially straight ahead is thus produced on the air outlet side 102.

As can be seen in FIGS. 1 and 2, the rear face of the wing 108 bears closely against the rear face of the air-conveying element 106. In the transition region, in which the first air-conveying surface 140 transitions into the second air-conveying surface 142 on the side facing the air inlet opening 104, the wing 108 bears fully against the transition region, preferably without any gaps. Said transition region and therefore the rear face of the air-conveying element 106 and the rear face of the wing 108 are thus formed in a complementary manner.

The wing 108 has a geometric shape tapering in the direction of the air inlet side 104, wherein this shape simultaneously corresponds to a streamlined shape. Since there is a practically seamless transition between the wing 108 and the air-conveying surfaces 140 and 142, the air resistance when air flows over the wing 108 or around the wing 108 can be minimised.

Due to the egg shape of the air-conveying element 106, the air-conveying surfaces 140 and 142 have corresponding bulges, wherein the walls of the housing 124 follow this shape of the bulges in parallel and at a distance. Due to these bulges, it could be ensured in a particular way that the airflow exiting from the air outlet opening 102 is purposefully directed.

As viewed in the axial direction of extension of the housing 124, the housing has a region 126, in which is has practically a rectangular inner shape. Since, in addition (not visible in FIGS. 1 and 2), the wing 108 has a plane of symmetry that extends in FIGS. 1 and 2 inter alia in the plane of the drawing, the wing 108 can bear fully against the inner wall of the housing 124 in the stop positions shown in FIGS. 1 and 2. More specifically, the inner wall is thus sealed off fully to the left and right by the wing 108. Since, in addition, as viewed in the vertical direction, the air channel 120 or 122 is also fully closed in the stop positions as shown in FIGS. 1 and 2, it is ensured that a maximum airflow can be made possible through the remaining open air channel 120 or 122 respectively.

In order to then pivot the wing 108 between the end stop positions shown in FIGS. 1 and 2, a coupling is provided, which connects a manipulator 110 to the wing 108. The manipulator 110 is located here on the front face of the air-conveying element 106, that is to say on the air outlet side 102. A coupling rod 112 is mounted fixedly on the housing 124 and therefore fixedly on the air-conveying element 106 at a pivot point, for example a pin 118. The same is true in respect of a coupling rod 114, which is connected rigidly to the wing 108 and which is likewise mounted via a pin 116 on the housing 124 or the air-conveying element 106. The two coupling rods 112 and 114 are mechanically coupled to one another via a sliding block guide 128. If the manipulator 110 is now moved in the direction 502, that is to say substantially in the vertical direction of the air vent 100, this thus leads to a corresponding rotational movement of the wing 108 about the pin 116 due to the coupling rods 112 and 114. If the manipulator is thus moved downwardly as in FIG. 1 for example, this thus also leads simultaneously to a movement of the wing 108, likewise downwardly.

For the sake of clarity only one further coupling rod 200 is indicated in FIG. 2 and is connected via a further sliding block guide 202 to the coupling rod 112. This coupling rod 200 is connected to at least one further wing 306, wherein the wing 306 is arranged in the air inlet region 104 of the housing 124. This wing is normally constituted by a set of wings 306, which are all mechanically coupled to one another. These wings 306 can be rotated about a pin 308 in the horizontal direction of the air vent 100. It is thus made possible for an airflow flowing through the housing to be directed purposefully in the horizontal direction.

So that the movement of the manipulator 110 in the vertical direction 502 discussed with regard to FIGS. 1 and 2 does not lead to an undesired change of the horizontal position of the wing(s) 306, the coupling rod 200 is connected via a further sliding block guide 202 to the coupling rod 112. This sliding block guide 202 is configured here such that a movement of the coupling rods 112 and 200 in the direction 502, that is to say in the vertical direction, is possible without hindrance, without this leading to a transmission of force between the coupling rods 112 or 200. Only with a movement of the manipulator 110 into the plane of the drawing or out from the plane of the drawing, that is to say in the horizontal direction, is a force transmitted from the manipulator via the coupling rod 112 to the coupling rod 200 and therefore to the wing(s) 306 due to the sliding block guide. This leads to a pivoting of the wing 306 about the pin 308.

Figure 3:
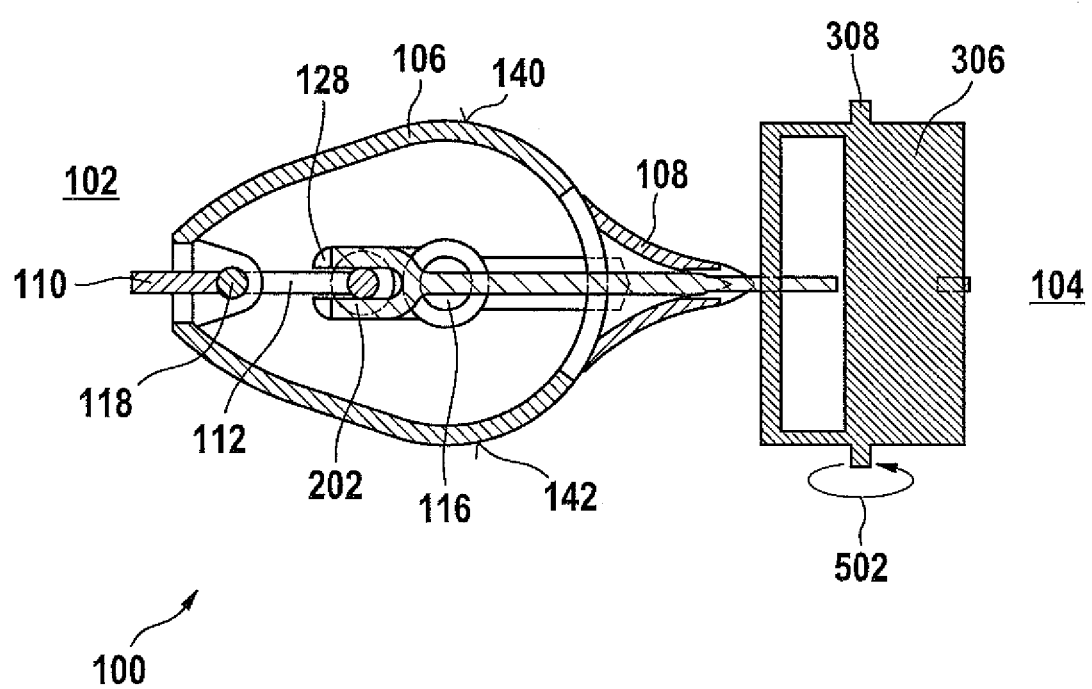
FIG. 3 shows a side sectional view of an air vent.

FIG. 3 shows a cross-sectional view of a further air vent 100, which is identical in terms of function to the air vent discussed with regard to FIGS. 1 and 2. Accordingly, identical reference signs have also been chosen. Due to the manipulator 110 and the integration thereof into the housing 124 (not shown in greater detail), the egg shape of the air-conveying element 106, which is housed rigidly with respect to the housing, is blunted. The air-conveying element 106 thus has, on the air outlet side 102, a flattened portion, to which the manipulator 110 is attached. As can be seen clearly in FIG. 3, all mechanical components necessary for the movement of the wing 108 are housed fully in the air-conveying element 106. The air flowing over the air-conveying element therefore is not influenced by said mechanical components.

Further, the sliding block guides 128 and 202 can be seen slightly more clearly and are provided in the present example in the form of stacked recesses in the coupling rods 200 and 114, with which complementary pins of the coupling rod 112 engage.

Figure 4:
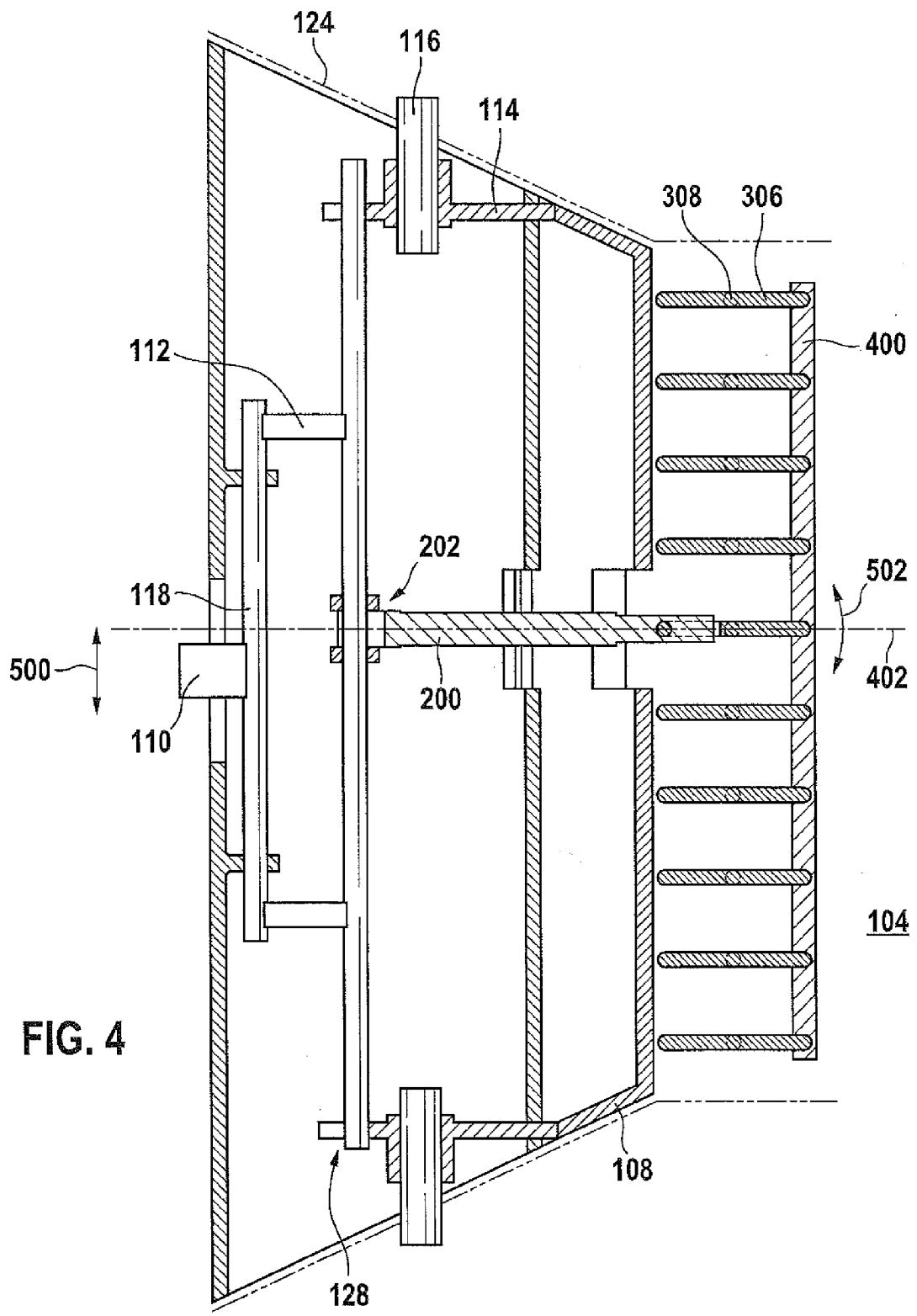
FIG. 4 shows a sectional view of the air vent of FIG. 3 as viewed from above.

FIG. 4 shows a sectional view of the air vent 100 of FIG. 3, as viewed from above, wherein the plurality of wings 306 in the air inlet region 104 are now visible. Each of these individual wings 306 is mounted rotatably about a vertical pin 308, wherein the wings are coupled via a common mechanical coupling 400. It is therefore sufficient for the coupling rod 200 to act merely on one of the wings 306 (the middle wing 306 in the example of FIG. 4). A transmission of force from the manipulator 110 via the coupling rod 112 and the coupling rod 200 to this middle wing 306 causes this wing and also all further wings 306 to be rotated about the pin 308.

For example, the manipulator 110 can be shifted in the horizontal direction 500, which causes a torque to be transmitted to the wing 306 via the coupling rod 112, the sliding block guide 202 and the coupling rod 200. The wings thus pivot about the pins 308 thereof in the direction 502, which means that the airflow can be steered in the horizontal direction of the air vent.

Figure 5:
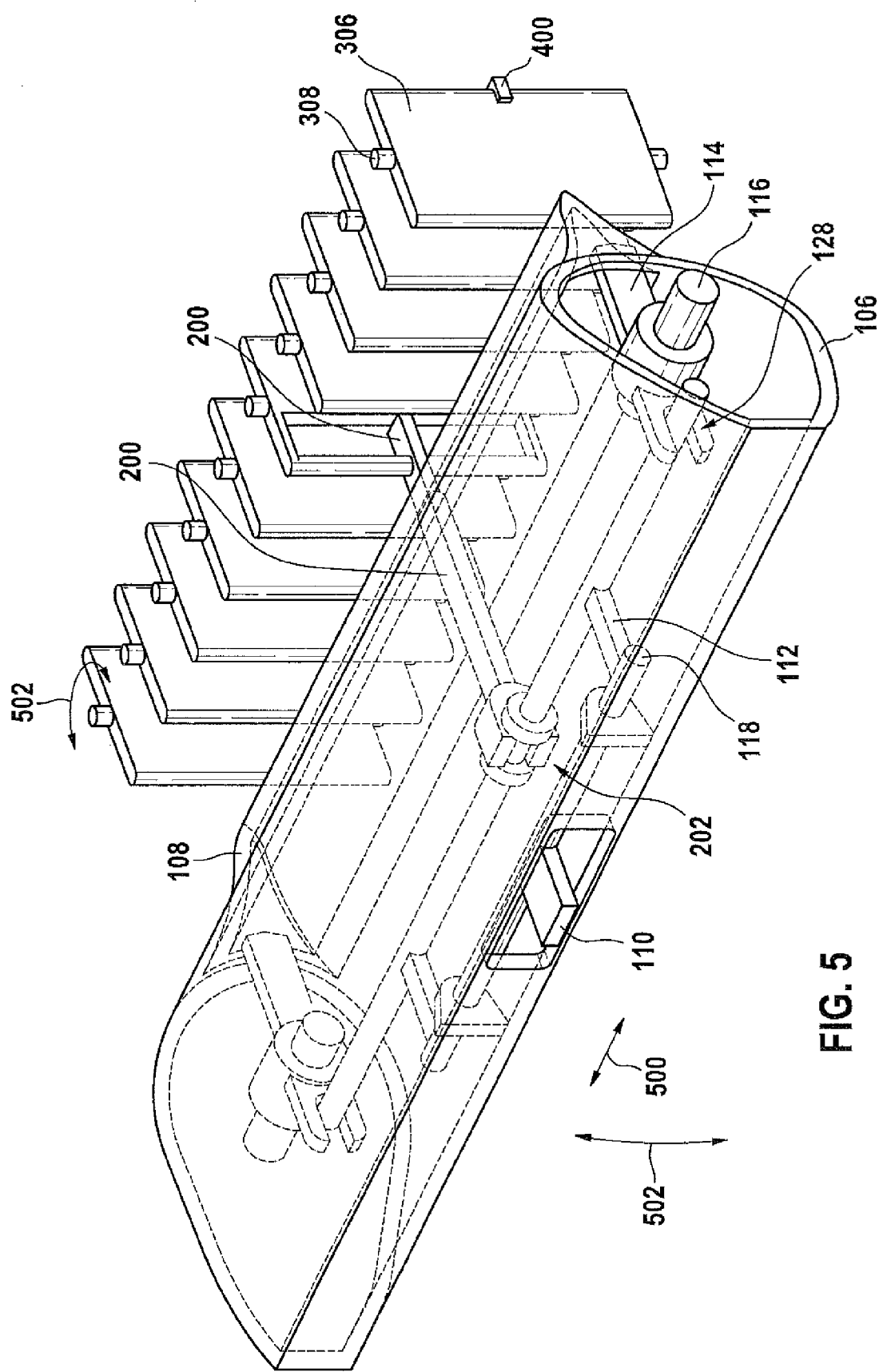
FIG. 5 shows a perspective view of the air vent of FIG. 3.

In the perspective view of FIG. 5, the air vent in FIGS. 3 and 4 is shown again in greater detail. A movement of the manipulator 110 in the horizontal direction, that is to say in the direction 500, means that the coupling rod 112 mounted horizontally displaceably along the pin 118 can likewise be displaced in the horizontal direction 500. The sliding block guide is formed by a fork-shaped seat of the coupling rod 114, wherein the coupling rod 112 engages with this seat. The coupling rod 112 is thus displaceable in the horizontal direction 500 in the link. This means that, with a purely horizontal movement of the manipulator 110, no force is transmitted to the wing 108.

By contrast, the sliding block guide 102 is configured such that the coupling rod 200 is connected to the coupling rod 112 such that the horizontal movement in the direction 500 also leads to a corresponding horizontal movement of the coupling rod 200. However, since this is connected to the wing 306 and the wing 306 is mounted pivotably about the vertical pin 308, the horizontal movement in the direction 500 leads to a pivoting movement 502 of the wing 306.

A vertical or slightly circular movement of the manipulator 110 upwardly or downwardly in the direction 502 leads to a rotation of the coupling rod 112 about the pin 118. Due to the sliding block guide 202, however, the coupling rod 112 will rotate here merely in the fork-shaped link of the coupling rod 200, without this resulting in a movement of the wing 306. Where applicable, the coupling rod 200 can be configured such that it can follow a slight movement, which may or may not be provided, of the coupling rod 112 in the vertical direction in a compensatory manner.

The sliding block guide 128, by contrast, is then embodied such that the tilting movement of the coupling rod 112 about the pin 118 leads to a transmission of force from the coupling rod 112 to the coupling rod 114. The coupling rod 114 rotates here about its pin 116. This, in turn, causes the wing 108 arranged on the coupling rod 114 to be moved on the rear side of the air-conveying element 106. As already described above, it is thus possible to steer the airflow in the vertical direction of the air vent.

LIST OF REFERENCE SIGNS 100 air vent
102 air discharge opening
104 air inlet opening
106 air-conveying element
108 wing
110 manipulator
112 coupling rod
114 coupling rod
116 pin
118 pin
120 air channel
122 air channel
124 housing
126 portion
128 sliding block guide
140 air-conveying surface
142 air-conveying surface
200 coupling rod
202 sliding block guide
306 wing
308 pin
400 coupling
402 axial direction
500 horizontal direction
502 vertical direction

The invention claimed is:

1. An air vent having
   a housing,
   an air inlet opening located in an axial direction with respect to the housing and an air discharge opening opposite the air inlet opening,
   an air-conveying element located in the housing having a first air-conveying surface and a second air-conveying surface, which is opposite the first air-conveying surface, wherein a first air channel is formed by an inner wall of the housing and the first air-conveying surface and a second air channel is formed by the inner wall of the housing and the second air-conveying surface, the air-conveying element being in a fixed position with respect to the inner wall of the housing, wherein the first air channel is configured to transport to the air discharge opening a first volume flow of air that can flow into the housing through the air inlet opening, wherein the second air channel is configured to transport to the air discharge opening a second volume flow of air that can flow into the housing through the air inlet opening,
   a first wing, wherein the first wing is arranged movably on an end of the air-conveying element facing the air inlet opening, wherein the movability of the first wing is configured such that the ratio of first volume flow to second volume flow can be adjusted on account of a position of the first wing.

2. The air vent according to claim 1, wherein the first air-conveying surface transitions into the second air-conveying surface in a transition region at the end of the air-conveying element facing the air inlet opening, wherein the first wing bears against the air-conveying element in the transition region.

3. The air vent according to claim 2, wherein the first wing has a symmetrical shape tapering in the direction of the air inlet opening, wherein the side of the first wing opposite the air discharge opening is formed in a manner complementary to the transition region.

4. The air vent according to claim 1, wherein the first air-conveying surface has a first bulge and the second air-conveying surface has a second bulge, wherein the first bulge points in a first direction and the second bulge points in a second direction, wherein the first direction and the second direction are directed oppositely and point perpendicularly to the axial direction, wherein the inner side of the housing
   in the region of the first bulge has a third bulge pointing in the first direction and/or
   in the region of the second bulge has a fourth bulge pointing in the second direction.

5. The air vent according to claim 1, wherein the first wing is movable between a first and a second position, wherein in the first position the first air channel is fully closed by the first wing, and wherein in the second position the second air channel is fully closed by the first wing.

6. The air vent according to claim 1, further comprising a lighting means, wherein the lighting means is arranged between the air discharge opening and the first wing.

7. The air vent according to claim 1, further having a set of second wings, wherein the first wing is pivotable in a direction lying in a first plane, wherein the second wings are pivotable in a direction lying in a second plane, wherein the first plane and the second plane are arranged perpendicularly to one another, wherein the flow direction of the air that can flow into the housing through the air inlet opening can be adjusted in the second plane due to the pivotability of the second wing.

8. The air vent according to claim 7, wherein the second wings are arranged between the first wing and the air inlet opening as viewed in the axial direction of the housing.

9. The air vent according to claim 1, further having a closure element, wherein the closure element is arranged between the air inlet opening and the first wing, wherein the closure element is movable between an open position and a closed position, wherein in the open position an air passage between the air inlet opening and the air discharge opening is released and in the closed position the air passage between the air inlet opening and the air discharge opening is blocked.

10. The air vent according to claim 9, wherein the closure element comprises a plurality of plates, wherein the plates are hinged via a common pivot pin on the housing, wherein the movability of the closure element between the open position and the closed position is provided via a rotation of the plates about the pivot pin.

11. The air vent according to claim 1, further having a manipulator at the air discharge opening of the housing, wherein the manipulator is mechanically coupled via a first coupling to the first wing, wherein the first coupling is configured to convert a movement of the manipulator in a first or second direction into a movement of the first wing in the first or second direction.

12. The air vent according to claim 11, wherein the first coupling comprises a first coupling rod coupled to the manipulator and a second coupling rod coupled to the first wing, wherein the first coupling rod is mounted pivotably about a first pivot point, wherein the second coupling rod is mounted pivotably about a second pivot point, wherein the first coupling rod and the second coupling rod are mechanically coupled to one another via a first sliding guide block.

13. The air vent according to claim 12, wherein the manipulator is mechanically coupled via a second coupling to a set of second wings, wherein the second coupling is configured to convert a movement of the manipulator in a direction lying in the second plane perpendicularly to the first direction and perpendicularly to the axial direction of the housing into the pivoting movement of the second wings.

14. The air vent according to claim 13, wherein the second coupling comprises a third coupling rod, wherein the third coupling rod is coupled to at least one of the second wings, wherein the first coupling rod and the third coupling rod are mechanically coupled via a second sliding guide block for a transmission of force between the first coupling rod and the third coupling rod, wherein the first sliding guide block is configured to allow a relative movability of the first coupling rod and of the second coupling rod in the direction lying in the second plane perpendicularly to the first direction and perpendicularly to the axial direction of the housing.

15. The air vent according to claim 11, wherein the first coupling is arranged fully in the air-conveying element, and/or wherein the first air-conveying surface has a first bulge and the second air-conveying surface has a second bulge, wherein the first bulge points in a first direction and the second bulge points in a second direction, wherein the first direction and the second direction are directed oppositely and point perpendicularly to the axial direction, wherein the inner side of the housing in the region of the first bulge has a third bulge pointing in the first direction and/or in the region of the second bulge has a fourth bulge pointing in the second direction, wherein the third bulge runs parallel to the first bulge and/or the fourth bulge runs parallel to the second bulge, and/or wherein the first wing is movable between a first and a second position, and/or wherein the first wing has a plane of symmetry, and/or wherein the housing and the first wing are configured such that, as viewed in the plane of symmetry, the first wing in the first and second position bears fully against the inner wall of the housing.

16. The air vent according to claim 1, wherein the second air-conveying surface is symmetrical with respect to the first air-conveying surface.

17. The air vent according to claim 1 wherein the air-conveying element is rigid with respect to the housing.

18. The air vent according to claim 1 wherein the air-conveying element has a cross section shaped in the manner of a truncated egg.

19. The air vent according to claim 1 wherein the inner wall of the housing has a rectangular shape at the height of the position of the first wing, as viewed in the axial direction with respect to the housing.

20. The air vent according to claim 1 wherein the first wing nestles against a rear face of the air-conveying element.

21. An air vent comprising:
a housing;
an air inlet opening located in an axial direction with respect to the housing and an air discharge opening opposite the air inlet opening;
an air-conveying element located in the housing having a first air-conveying surface and a second air-conveying surface, which is opposite the first air-conveying surface, wherein a first air channel is formed by the housing and the first air-conveying surface and a second air channel is formed by the housing and the second air-conveying surface, wherein the first air channel is configured to transport to the air discharge opening a first volume flow of air that can flow into the housing through the air inlet opening, wherein the second air channel is configured to transport to the air discharge opening a second volume flow of air that can flow into the housing through the air inlet opening; and
a first wing, wherein the first wing is arranged movably on an end of the air-conveying element facing the air inlet opening, wherein the movability of the first wing is configured such that the ratio of first volume flow to second volume flow can be adjusted on account of a position of the first wing, wherein the first wing is movable between a first and a second position, wherein in the first position the first air channel is fully closed by the first wing, and wherein in the second position the second air channel is fully closed by the first wing.

* * * * *